United States Patent
Schlichting et al.

(10) Patent No.: US 7,918,081 B2
(45) Date of Patent: Apr. 5, 2011

(54) FLAME PREVENTION DEVICE

(75) Inventors: Kevin W. Schlichting, Storrs, CT (US); Donn R. Blankenship, Southbury, CT (US); Melvin Freling, West Hartford, CT (US); Michael J. Maloney, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 1141 days.

(21) Appl. No.: 11/641,178

(22) Filed: Dec. 19, 2006

(65) Prior Publication Data
US 2008/0141644 A1   Jun. 19, 2008

(51) Int. Cl.
*F02G 3/00*   (2006.01)
*F16P 1/02*   (2006.01)

(52) U.S. Cl. ........ 60/39.11; 60/39.091; 169/48; 285/53; 442/136; 448/920

(58) Field of Classification Search ............. 60/779, 60/39.091, 39.11; 169/48; 285/53, 923; 442/136–147, 169, 180, 263, 301–302; 448/920–921; 138/149, 123
See application file for complete search history.

(56) References Cited

U.S. PATENT DOCUMENTS

| | | | |
|---|---|---|---|
| 3,779,006 A * | 12/1973 | Lewis et al. ............. | 60/39.11 |
| 3,858,618 A * | 1/1975 | Kaufman ................ | 138/149 |
| 4,067,190 A * | 1/1978 | Hamm et al. ........... | 60/723 |
| 4,691,741 A * | 9/1987 | Affa et al. .............. | 138/113 |
| 4,844,974 A | 7/1989 | McCullough, Jr. et al. | |
| 4,874,648 A * | 10/1989 | Hill et al. ............... | 428/35.9 |
| 4,961,989 A * | 10/1990 | Grimwood ............. | 442/60 |
| 4,999,236 A * | 3/1991 | McCullough et al. .... | 442/275 |
| 5,267,832 A | 12/1993 | Johnson et al. | |
| 5,298,299 A * | 3/1994 | Shea ...................... | 428/34.5 |
| 5,318,018 A * | 6/1994 | Puma et al. ............ | 128/202.11 |
| 5,458,343 A | 10/1995 | Dornfeld et al. | |
| 5,499,663 A * | 3/1996 | Barbeau et al. ........ | 139/420 A |
| 5,819,316 A * | 10/1998 | Aldridge ................ | 2/81 |
| 5,976,997 A * | 11/1999 | Meaney et al. ........ | 442/232 |
| 6,216,791 B1 * | 4/2001 | Alhamad ............... | 169/45 |
| 6,338,366 B1 * | 1/2002 | Williams ............... | 138/149 |
| 6,358,591 B1 * | 3/2002 | Smith .................... | 428/74 |
| 6,562,741 B1 * | 5/2003 | Lilani .................... | 442/301 |
| 6,698,522 B1 * | 3/2004 | Alhamad ............... | 169/45 |
| 6,746,755 B2 * | 6/2004 | Morrison et al. ...... | 428/166 |
| 6,887,543 B1 * | 5/2005 | Louart et al. .......... | 428/36.9 |
| 7,441,351 B2 * | 10/2008 | Clark et al. ............ | 36/138 |
| 7,503,664 B2 * | 3/2009 | Moreau .................. | 359/530 |
| 7,615,504 B2 * | 11/2009 | Porter et al. ........... | 442/180 |
| 7,624,762 B2 * | 12/2009 | Cohen et al. ........... | 138/149 |
| 2003/0060107 A1 | 3/2003 | Gooliak | |
| 2003/0111238 A1 | 6/2003 | Anderson | |
| 2006/0151043 A1* | 7/2006 | Nanney et al. ......... | 138/125 |
| 2008/0169038 A1* | 7/2008 | Sellis et al. ............ | 138/149 |
| 2009/0049868 A1* | 2/2009 | Malloy .................. | 66/170 |
| 2009/0223585 A1* | 9/2009 | Buller ................... | 138/110 |

* cited by examiner

*Primary Examiner* — William H Rodríguez
(74) *Attorney, Agent, or Firm* — Bachman & LaPointe, P.C.

(57) ABSTRACT

A gas turbine engine includes an engine casing concentrically disposed around the following: a low pressure compressor; a turbine; and a high pressure compressor having at least one bleed tube and at least one joint proximate to the engine casing; and at least one flame prevention device adapted to cover at least a portion of at least one gas turbine engine component.

14 Claims, 4 Drawing Sheets

FLAME PREVENTION DEVICE

FIELD OF THE INVENTION

The invention relates to flame prevention devices and, more particularly, relates to flame prevention devices for use in aircraft engines.

BACKGROUND OF THE INVENTION

Regardless of all precautions taken by a manufacturer of an aircraft or of an aircraft engine, and of those taken by an operator of the aircraft during its use, fire hazards resulting from, for example, the leakage of jet fuel, blade rub initiating a fire, are nevertheless an occasional possibility. If such a situation should occur in close vicinity to an engine in operation, the high temperatures of a titanium fire of approximately 3000° F. (1649° C.) to 6000° F. (3316° C.) significantly increase the potential to soften and melt engine parts such as bleed tubes and joints that are disposed through the engine case.

Therefore, means must be provided to minimize the risk of fire and reduce the possibility of fire propagation.

SUMMARY OF THE INVENTION

In accordance with one aspect of the present invention, a gas turbine engine broadly comprises an engine casing concentrically disposed around the following: a low pressure compressor; a turbine; and a high pressure compressor; and at least one flame prevention device adapted to cover at least a portion of at least one gas turbine engine component.

In accordance with another aspect of the present invention, a gas turbine engine component broadly comprises a gas turbine engine component having at least a portion of an exterior surface covered by at least one flame prevention device.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
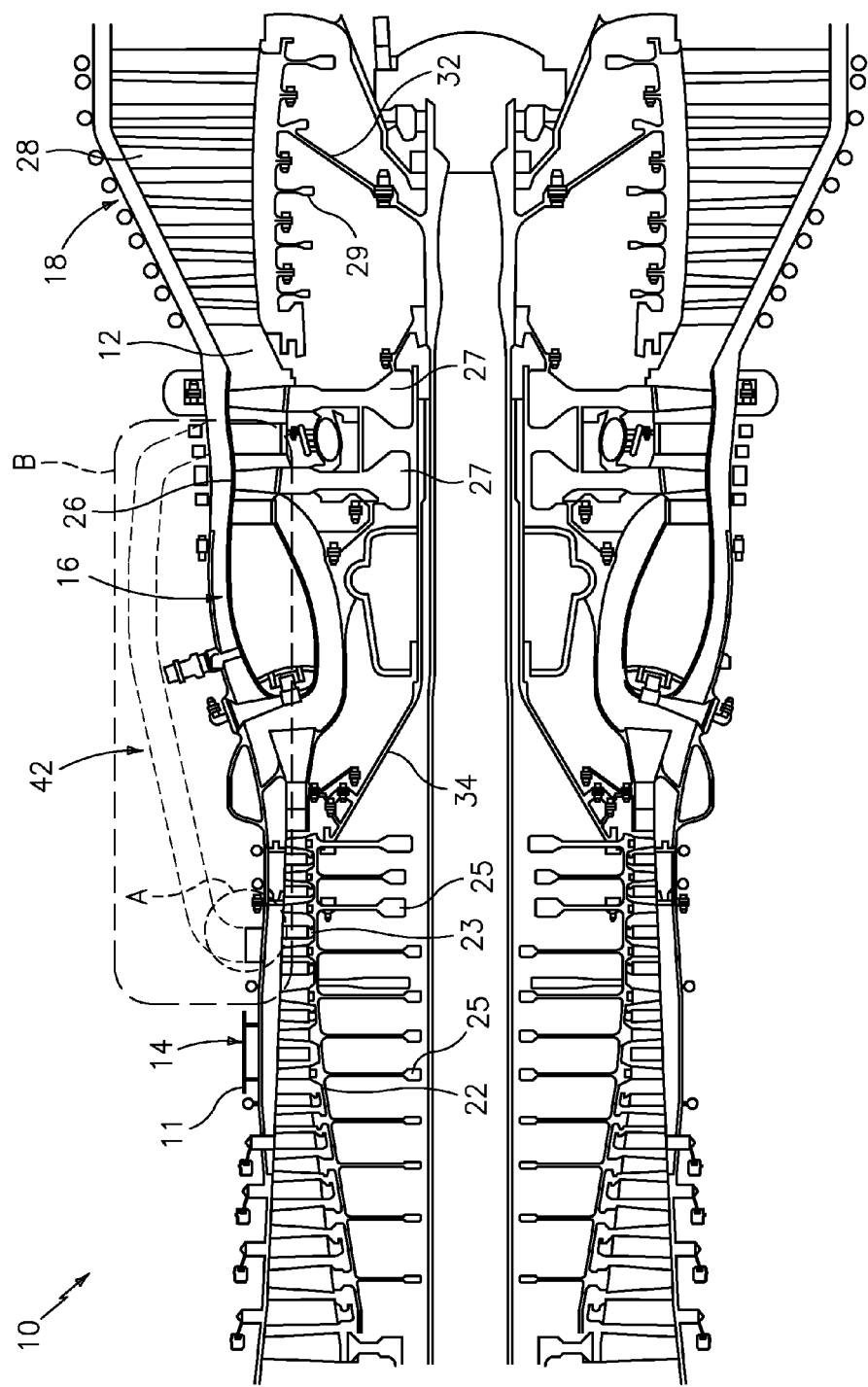
FIG. 1 is a representation of a cross-sectional view of a typical gas turbine engine.
Figure 2:
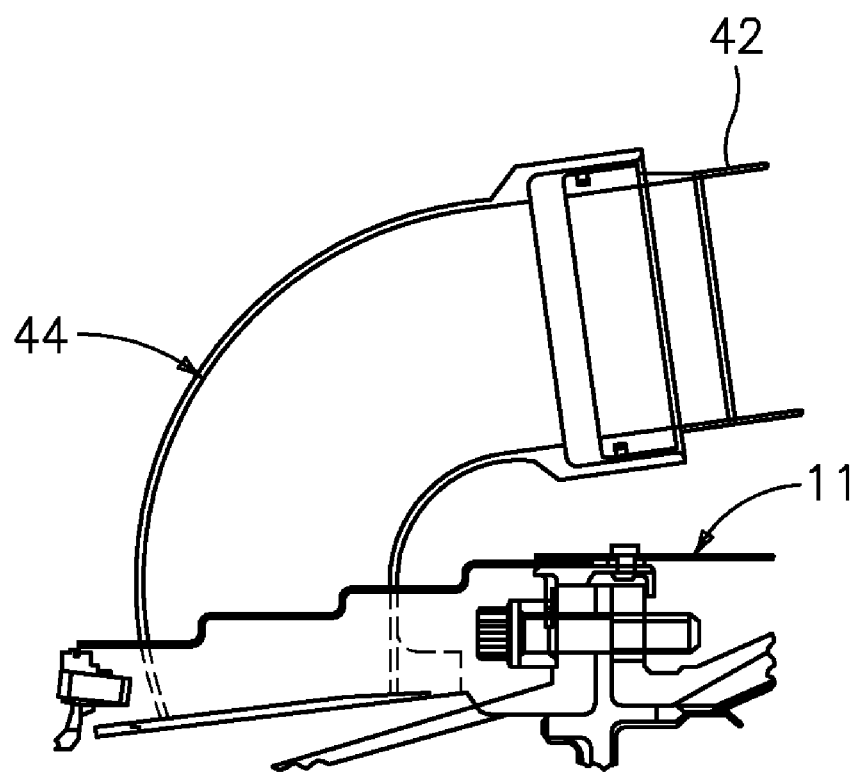
FIG. 2 is a representation of a cross-sectional view of area A of FIG. 1 illustrating in detail an elbow joint attachment of a bleed tube assembly to an engine casing.

Referring now to FIGS. 1 and 2, a cross-sectional view of a typical gas turbine engine 10 enclosed within an engine casing 11 is shown. The gas turbine engine includes an annular flowpath 12 extending axially through a compressor section 14, a combustion section 16, and a turbine section 18. The compressor section 14 includes a high pressure compressor 22, having a rotor drum 23 comprised of a plurality of rotating disks 23, and a low pressure compressor (not shown). The turbine section 18 has a high pressure turbine 26 having a plurality of rotating disks 27 and a low pressure turbine 28 having a plurality of rotating disks 29. A low pressure rotor 32 connects the low pressure turbine disks 29 to the low pressure compressor. A high pressure rotor 34 connects the high pressure turbine disks 27 to the high pressure compressor rotor drum 23. Working fluid is conducted through the flowpath 12 of the compressor section 14 and into the turbine section 26. The compressor section 14 may include at least one bleed tube assembly 42 that may be disposed external to the engine casing 11 and connected from the compressor section 14 to the combustion section 16. The bleed tube assembly 42 may be connected to the engine housing using joints as known to one of ordinary skill in the art. In a non-limiting example, elbow joints 44, 46 may be used to connect each end of the bleed tube assemblies 42 to the engine casing 11.

Figure 3:
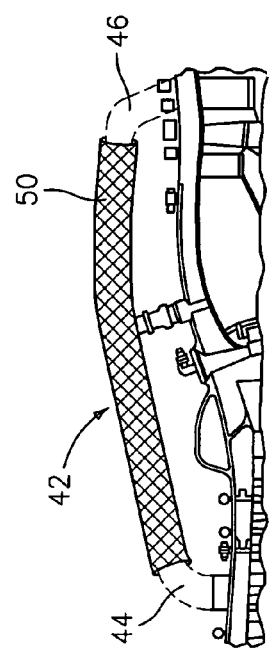
FIG. 3 is a representation of a view of area B of FIG. 1 illustrating an exemplary flame prevention device disposed upon the bleed tube assembly of FIG. 1.
Figure 4:
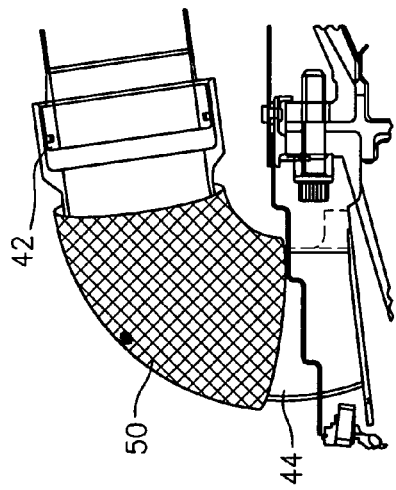
FIG. 4 is a representation of a view of area A of FIG. 1 illustrating an exemplary flame prevention device disposed upon the elbow joint of FIG. 1.

Referring now to FIGS. 3 and 4, each bleed tube assembly 42 may include a non-limiting, exemplary flame prevention device 50 covering at least a portion of the assembly 42. The flame prevention device 50 may be a substantially sleeve-shaped device composed of at least one layer, or multiple layers, of at least one woven flame retardant material. The substantially sleeve-shaped device may usefully be flexible and form-fitting to accommodate the shape of the bleed tube assembly 42 (See FIG. 3), or other gas turbine engine component, e.g., a joint 44, 46 (See FIG. 4). The exemplary substantially sleeve-shaped device may be disposed upon bleed tube assembly 42 or joint 44, 46 by wrapping the at least one layer of flame retardant material about the component and securing the material using the fastening means described herein. The ends of the substantially sleeve-shaped device may then be affixed to the engine casing by any fastening means such as, but not limited to, sandwiching the material between metal plates; disposing fasteners through the material; using clamps, rings, and the like; applying adhesives to the material; combinations of the aforementioned fastening means, and the like. In the alternative, the exemplary flame prevention device 50 may be a substantially sock-shaped device and may only possess one open end. The substantially sock-shaped flame prevention device 50 may be utilized to impart flame prevention to various other turbine engine components.

The exemplary flame prevention device 50 may be composed of at least one flame retardant material such as ceramics (e.g., alumina, mullite, zirconia, and the like), silicates and aramid fiber based materials. Suitable aramid fiber based materials may be a type of Kevlar®, commercially available from E.I. du Pont de Nemours & Co., Wilmington, Del. The flame prevention device 50 may be a weave composed of a single material, for example, ceramic based fibers, or a co-weave of a combination of materials, for example, ceramic based fibers and aramid fiber based material woven together. The flame retardant material may include a flame retardant coating such as a ceramic material, silicate material, and the like, to further impart flame retardant properties to flame prevention device 50. The flame retardant material may be coated prior to being woven, while being woven, or after having been woven but prior to being placed upon the gas turbine engine component, or even after being placed upon the gas turbine engine component.

Figure 5:
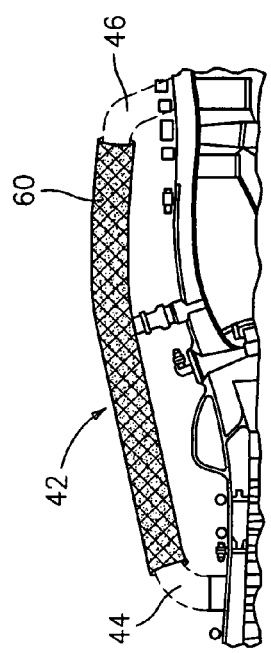
FIG. 5 is a representation of a view of area B of FIG. 1 illustrating another exemplary flame prevention device disposed upon the bleed tube assembly of FIG. 1.
Figure 6:
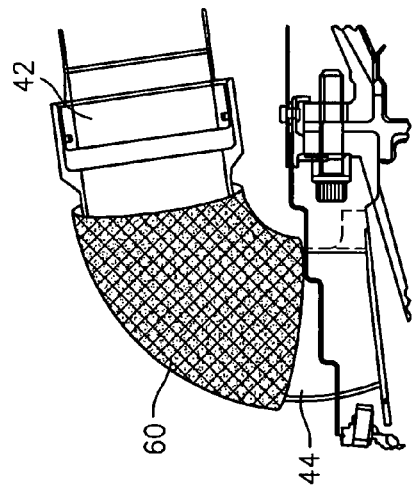
FIG. 6 is a representation of a view of area A of FIG. 1 illustrating another exemplary flame prevention device disposed upon the elbow joint of FIG. 1.

Referring now to FIGS. 5 and 6, each bleed tube assembly 42 may also include yet another exemplary flame prevention device covering at least a portion of the assembly 42. The flame prevention device 60 may comprise at least one piece of flame retardant material substantially covered by a coating. For example, the flame prevention device 60 may be a shell comprising a first half and a second half or, in the alternative, more than two halves such that the shell is composed of more than two pieces that may be assembled to form the flame prevention device 60 disposed about the gas turbine engine component. The pieces of flame retardant material may be composed of a flame retardant ceramic foam known to one of ordinary skill in the art. The flame retardant ceramic foam may be preformed to the dimensions and shape of the gas turbine engine component or may be a solid piece of ceramic foam that is later sized to fit the dimensions and shape of the gas turbine engine component.

In all of the exemplary embodiments and their alternatives, the flame retardant materials may be woven to form a weave pattern designed to prevent or at least substantially prevent the complete penetration of molten metal through the exemplary flame prevention devices described herein. Each layer of flame retardant material may possess the same weave pattern or a different weave pattern. Any one of a number of weave patterns may be utilized to achieve the desired effect. For example, the woven flame retardant material may have a weave pattern such as plain, twill, basket, Leno, Satin, Herringbone, as known to one of ordinary skill in the art. Generally, the flame prevention device 50 may possess a thickness of about about 5 mils (127 µm) to about 2000 mils ($5.08 \times 10^4$ µm); the intended thickness being sufficient to prevent or substantially prevent the complete penetration of molten metal through the exemplary flame prevention devices described herein.

All of the exemplary flame prevention devices described herein may include a flame retardant coating such as a ceramic material, silicate material, and the like, to further impart flame retardant properties to the flame prevention devices. The pieces of flame retardant material may be coated prior to being woven, while being woven, or after having been woven or preformed but prior to being placed upon the gas turbine engine component, or even after being installed upon the gas turbine engine component. The flame retardant material may be usefully coated prior to being installed upon the gas turbine engine component. The pieces of flame retardant material may be coated at step 70 of FIG. 7 using any one of a number of coating techniques known to one of ordinary skill in the art.

Figure 7:
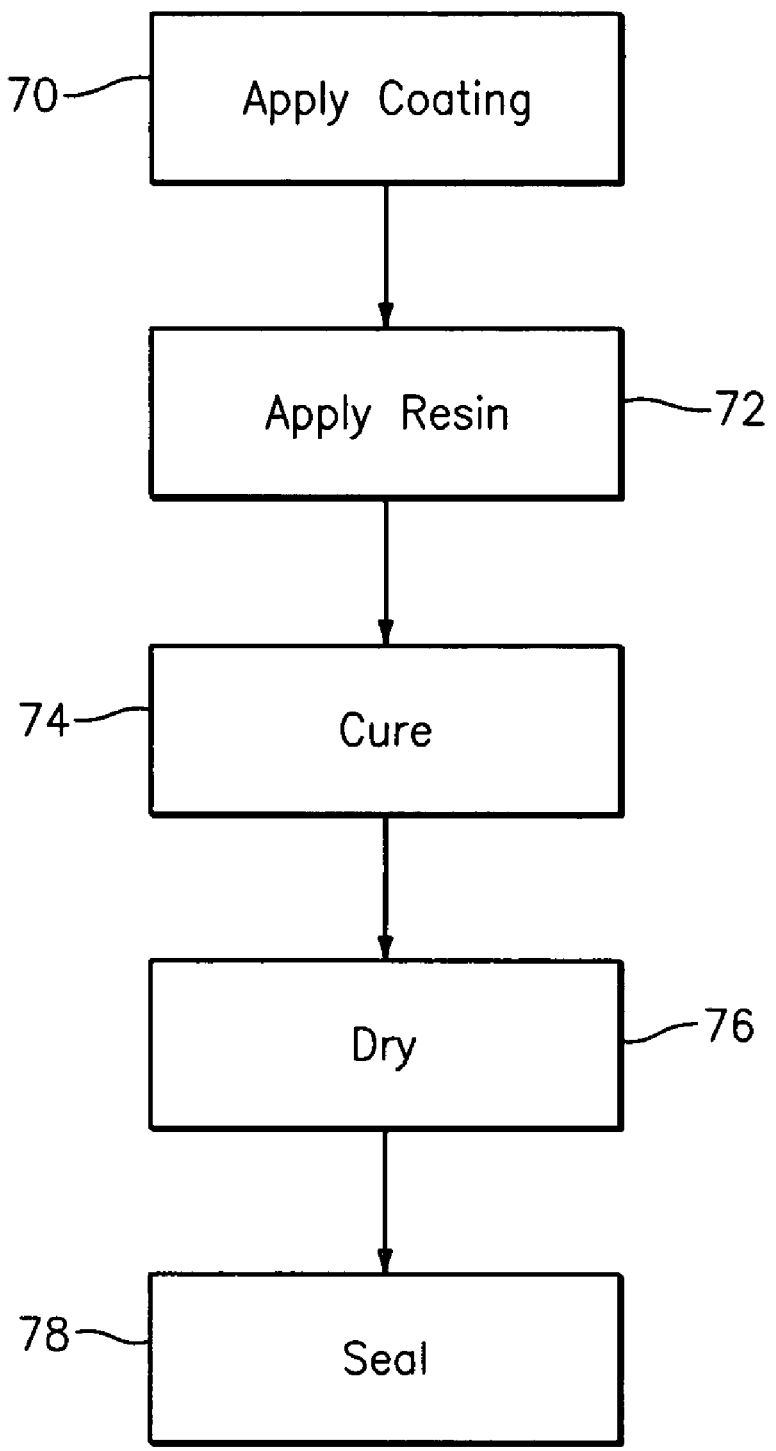
FIG. 7 is a representation of a flowchart illustrating an exemplary process for coating the exemplary flame prevention devices described herein.

Once the flame prevention device(s) is coated, the device may be further treated with a heat- or UV-curable resin at step 72 of FIG. 7. The resin may be applied using a vacuum impregnation technique as known to one of ordinary skill in the art. Each piece, or the entire device, may be immersed in a solution containing a solvent, at least one UV-curable resin or at least one heat curable resin, at least one dispersant, and in the alternative, or in addition to, at least one surfactant, at a temperature of about 68° F. (20° C.) to about 150° F. (66° C.) and initially under a vacuum of about 10 torr (0.19 psi) to about 100 torr (1.9 psi) for about 2 to about 10 minutes at which point the pressure may then be adjusted to atmospheric pressure.

In the alternative, the solution may also be applied by spraying, brushing, painting, combinations comprising at least one of the foregoing techniques, and the like. For example, suitable spraying processes include, but are not limited to, air pressure spraying, airless spraying, thermal spraying processes, air plasma spraying processes, high velocity oxygen fuel spraying processes, combinations comprising at least one of the foregoing spraying processes, and the like. Suitable heat- and UV-curable resins are preferably impart properties such as, but not limited to, hardness, elongation, chemical resistance, and the like, to the exemplary flame prevention devices described herein as known to one of ordinary skill in the art. Suitable solvent(s), dispersant(s), and surfactant(s) may be selected based upon their compatibility with the curable resin as known to one of ordinary skill in the art.

Once the curable resin dries, the resin coated flame retardant material, or flame prevention device itself, may be cured at step 74 of FIG. 7. When utilizing a UV-curable resin, the resultant resin coated flame retardant material may be treated with ultra-violet light energy to cure the resin. The coated article may be treated with ultra-violet light energy for about 10 seconds to about 60 seconds using any one of a number of processes known to one of ordinary skill in the art. In the alternative, when utilizing a heat curable resin, the resultant coated flame retardant material, or flame prevention device itself, may be treated at a temperature of about 300° F. (149° C.) for about 20 minutes to about 60 minutes in an oven, or similar suitable apparatus, as known to one of ordinary skill in the art.

After curing the resin coated flame retardant material, the pieces, or flame prevention device itself, may be dried at step 76 of FIG. 7 to evaporate or burn off the excess solvent, dispersant and/or resin materials. The material or device may be dried using any one of a number of suitable drying processes known to one of ordinary skill in the art. Suitable drying processes include, but are not limited to, air drying, drying under pressure, drying under a heating element, combinations comprising at least one of the foregoing processes, and the like. The amount of time necessary to dry the material or device may depend upon several factors and, in particular, the solvent of the suspension.

At step 78 of FIG. 7 the pieces, or the flame prevention device(s), may be sealed together using any number of mechanical fasteners, adhesives, coatings, combinations comprising at least one of the foregoing, and the like, as known to one of ordinary skill in the art. The pieces of the flame prevention device 50 may be sealed together using an adhesive or a coating. For example, a coating, e.g., a ceramic coating, may be applied upon assembling the pieces about the gas turbine engine component. For example, as the coating dries, the pieces may harden and seal together to form the exemplary flame prevention device(s) described herein. Although mechanical fasteners may adequately hold the pieces together, the mechanical fasteners may liberate during engine use.

EXPERIMENTAL SECTION

Experiment 1

A quantity, 5 pounds of a nickel based alloy containing Ni, Cr, Ti, Fe, Mo, which was representative of a potential molten alloy that could be generated during a rapid oxidation event, was melted in a vacuum furnace at a pressure of $9.7 \times 10^{-4}$ Torr to $9.7 \times 10^{-5}$ Torr and at a temperature of 2850° F. to form a molten nickel based alloy. The quantity of molten nickel based alloy was poured in a vacuum furnace by emptying the crucible into a ceramic pour cup which directed the molten nickel based alloy onto a AMS 4911 titanium alloy plate measuring 5 in.×8 in.×0.040 in. A partial pressure (below ambient pressure) of argon was applied to the titanium alloy plate and molten nickel based alloy for a time period of 15 minutes. The molten nickel based alloy penetrated completely the titanium alloy plate in 0.5 seconds.

Experiment 2

A quantity, 3 pounds of a nickel based alloy containing Ni, Cr, Ti, Fe, Mo, which was representative of a potential molten alloy that could be generated during a rapid oxidation event, was melted in a vacuum furnace at a pressure of $9.7 \times 10^{-4}$ Torr to $9.7 \times 10^{-5}$ Torr and at a temperature of 2850° F. to form a molten nickel based alloy. The quantity of molten nickel based alloy was poured in a vacuum furnace by emptying the crucible into a ceramic pour cup which directed the molten nickel based alloy onto an AMS 4911 titanium alloy plate measuring 4 in.×4 in.×0.040 in. where the backside was covered entirely with a flame prevention device composed of a sleeve having 1 layer(s) of woven flame retardant material. The flame retardant material was a Nextel™ 610 aluminum oxide ceramic fiber blanket that was 6 in.×6 in.×0.014 in. thick and was woven with a Twill pattern to a Denier of 3000. A partial pressure (below ambient pressure) of argon was then applied to the titanium alloy plate and molten nickel based alloy for a time period of 15 minutes. The flame prevention device insulated approximately 90%-95% of the total surface area of the titanium alloy plate from being penetrated by the molten nickel based alloy. The titanium alloy plate exhibited approximately 5% oozing and approximately 3% penetration, but not complete penetration, by the molten nickel based alloy.

The flame prevention device(s) of the present invention prevents, or at least substantially prevents, the complete penetration of molten metal through titanium alloy plates, the same material used to construct gas turbine engine casings. The present flame prevention device(s) offers a cost effective and lightweight alternative to plasma spray coatings once used to impart flame retardant properties to gas turbine engine components.

One or more embodiments of the present invention have been described. Nevertheless, it will be understood that various modifications may be made without departing from the spirit and scope of the invention. Accordingly, other embodiments are within the scope of the following claims.

What is claimed is:

1. A gas turbine engine, comprising:
    an engine casing concentrically disposed around the following:
    a low pressure compressor;
    a turbine; and
    a high pressure compressor; and
    at least one flame prevention device surrounding at least a portion of at least one gas turbine engine component, said at least one flame prevention device comprising a hollow sleeve having at least one layer of a flame retardant material coated with one of a ceramic material, a silicate material, and an aramid fiber material, and said at least one layer of said flame retardant material being treated with a resin.

2. The gas turbine engine of claim 1, wherein said at least one layer of said flame retardant material comprises at least one woven flame retardant material.

3. The gas turbine engine of claim 2, wherein said sleeve is flexible and form-fitting.

4. The gas turbine engine of claim 2, wherein said woven flame retardant material has a weave pattern of any one of the following: plain, twill, basket, Leno, Satin, and Herringbone.

5. The gas turbine engine of claim 1, wherein said sleeve comprises at least two half shells sealed together.

6. The gas turbine engine of claim 5, wherein said half shells comprise at least two pieces of a flame retardant ceramic foam.

7. The gas turbine engine of claim 5, wherein said half shells are sealed together using any one of the following: mechanical fasteners, coatings and adhesives.

8. The gas turbine engine of claim 1, wherein said at least one gas turbine engine component is at least one of a bleed tube disposed external to the engine casing and connecting a compressor section to a combustion section and an elbow joint connecting an end of said bleed tube to said engine casing.

9. The gas turbine engine of claim 1, wherein said at least one flame prevention device has a thickness of about 5 mils (127 µm) to about 2000 mils ($5.08 \times 10^4$ µm).

10. The gas turbine engine of claim 1, wherein said resin is selected from the group consisting of a UV-curable resin and a heat-curable resin.

11. The gas turbine engine of claim 1, wherein said flame retardant material is coated with a ceramic selected from the group consisting of alumina, mullite, and zirconia.

12. A gas turbine engine, comprising:
    a gas turbine engine component having at least a portion of an exterior surface covered by at least one flame prevention device; and
    said gas turbine engine component comprising at least one of a bleed tube disposed external to the engine casing and connecting a compressor section to a combustion section and an elbow joint connecting an end of said bleed tube to said engine casing;
    said at least one flame prevention device comprising at least two pieces of flame retardant material sealed together; and
    said at least two pieces comprising at least two pieces of a flame retardant ceramic foam.

13. The gas turbine engine of claim 12, wherein said at least two pieces of flame retardant material are sealed together using any one of the following: mechanical fasteners, coatings and adhesives.

14. The gas turbine engine of claim 12, wherein said at least one flame prevention device has a thickness of about 5 mils (127 µm) to about 2000 mils ($5.08 \times 10^4$ µm).

* * * * *